United States Patent [19]

Remerowski et al.

[11] Patent Number: 6,007,663

[45] Date of Patent: *Dec. 28, 1999

[54] METHOD OF ADHERING GLASS PRODUCTS TO A WORK SURFACE

[75] Inventors: David L. Remerowski; Duane C. Shomler; Anthony T. Racca; David J. Lococo, all of Cincinnati, Ohio

[73] Assignee: Senco Products, Inc., Cincinnati, Ohio

[ * ] Notice: This patent is subject to a terminal disclaimer.

[21] Appl. No.: 09/070,169

[22] Filed: Apr. 30, 1998

Related U.S. Application Data

[63] Continuation-in-part of application No. 08/689,200, Aug. 5, 1996, abandoned.

[51] Int. Cl.[6] ........................................... B32B 31/24
[52] U.S. Cl. ..................... 156/272.4; 156/274.8; 156/306.6; 156/307.7; 156/309.6; 156/324.4
[58] Field of Search .................... 156/71, 272.2, 156/272.4, 273.7, 274.4, 274.8, 275.5, 275.7, 306.9, 307.7, 309.6; 219/633, 634

[56] References Cited

U.S. PATENT DOCUMENTS

| | | | |
|---|---|---|---|
| 3,996,402 | 12/1976 | Sindt | 156/272.4 |
| 5,123,989 | 6/1992 | Horiishi et al. | 156/272.4 |
| 5,313,034 | 5/1994 | Grimm et al. | 156/274.2 |

OTHER PUBLICATIONS

Shields, J. Adhesives Handbook—3rd ed. Butterworth & Co., 1984. pp. 4–6, 196–197, and 264–265, Sep. 1984.

*Primary Examiner*—Michael W. Ball
*Assistant Examiner*—Michael A Tolin
*Attorney, Agent, or Firm*—Jerrold J. Litzinger

[57] ABSTRACT

A method for adhering glass products to a work surface which comprises placing adjacent to the surfaces of the pieces to be joined a continuous, non-perforated metallic foil strip, which absorbs electromagnetic waves. The strip which is contiguous with a heat activatable adhesive material, is positioned between the pieces and exposed to electromagnetic waves while the pieces are held together to form a bonded relationship between the pieces.

10 Claims, No Drawings

METHOD OF ADHERING GLASS PRODUCTS TO A WORK SURFACE

CROSS REFERENCE TO A RELATED APPLICATION

This application is a continuation-in-part of U.S. patent application Ser. No. 08/689,200 filed on Aug. 5, 1996, now abandoned

BACKGROUND OF THE INVENTION

This disclosure relates to the installation of glass products by adhesive attachment. "Glass products" is the term used in the construction and home furnishings industries to describe glass tiles and mirrors. These glass products are generally employed to construct and adorn walls and, occasionally, ceilings. On the job, the glass products are typically affixed to an underlayment of plaster, dry wall, concrete, cinder blocks and a variety of other decorative and non-decorative wall panels or coverings, including, occasionally, glass and tile wall panels.

The attachment of glass products to the work surface is typically effected by employing mechanical fastening devices such as brackets and adhesives. However, these attachment devices are rapidly falling into disfavor and new adhesives are being developed which are safer to work with and produce attachments that are actually more secure than the traditional attachment methods. However, the use of new adhesives alone is not the final answer. Current adhesives are messy and difficult to apply to "hidden" or inaccessible places. It is apparent, then, that inventions are waiting to be made which address the placement of adhesive material in a neat, clean, safe and effective manner that can be used beneficially in the construction trades, and especially with regard to the placement of glass products to a work surface.

Not surprisingly then, others have experimented with alternatives to traditional fastening and adhering devices for the attachment of construction products to a work surface.

DESCRIPTION OF THE PRIOR ART

U.S. Pat. No. 4,038,120 to Russell describes the use of an energized heating element or wire to heat a hot melt glue resulting in adhesion between contiguously assembled panels. The reference method involves heating a glue-coated wire to liquefy the glue producing a cohesive state and facilitating the assembly of panels. This method is particularly useful for introducing a cohesive material (glue) to an area of limited accessibility (groove), but the heating element (wire) requires the direct application of energy (electricity) to provide the heat to melt glue.

U.S. Pat. No. 3,574,031 to Heller et al. describes a method and material for welding thermoplastic bodies by using a susceptor between the bodies to be joined. The susceptor sealant is characterized by having particles, heatable by induction, dielectric or radiant energy, dispersed in a thermoplastic carrier compatible with the thermoplastic sheets to be welded. The welding of the thermoplastic sheets is effected by exposing the susceptor sealant to heat energy, softening the carrier material and joining all thermoplastic materials.

U.S. Pat. No. 3,996,402 to Sindt relates to the assembly of sheet materials by the use of a fastening device utilizing an apertured sheet of eddy current-conducting material sandwiched between coatings of hot-melt glue. An induction heating system is activated causing eddy current heating in the EC-conducting material with consequent melting of the hot-melt glue thus resulting in fusion and, ultimately, bonding of the sheet materials in accordance with the desired construction.

SUMMARY OF THE INVENTION

The presently disclosed method of adhering glass products to a work surface is distinguished from, and improves upon, the prior art by utilizing a device to be placed adjacent to the surfaces to be joined which comprises a target element contiguous with a heat activatable adhesive material said target element being absorbent of electromagnetic waves which are convertible to heat energy for activating the adhesive material, holding said surfaces together, and exposing said device to electromagnetic waves to produce heat sufficient to activate the adhesive material to effect an adhesive bond between the glass products and the work surface.

DESCRIPTION OF THE PREFERRED EMBODIMENT

Glass products comprising, for example, mirrors and glass tiles can be adhesively joined to a variety of work surfaces such as dry wall, plaster, cinder block, cement, wood, wallpaper, coated board, plastic laminate, painted sheet metal and other decorative and non-decorative work surfaces using the method and device herein described.

The method entails little more than simply placing, or perhaps securing, units of the disclosed device between or adjacent to the surfaces of the glass product and the work surface, putting the glass product in place and then activating the adhesive device with electromagnetic waves to adhesively join the glass product to its work surface.

Looking at the adhesive device employed in the disclosed method in greater detail, we see that the target element must, for the most part, be fashioned from materials or substances that are not transparent to electromagnetic waves. Indeed, the target element will necessarily be constructed of a composition that will absorb electromagnetic waves. Once absorbed by the target element, these waves will produce magnetic hysteresis and eddy currents resulting in heat energy which will melt or activate the contiguous adhesive material.

A suitable device is taught in U.S. application Ser. No.08/689,180 entitled Adhesive Device which was filed on Aug. 5, 1996, and is assigned to the assignee of the present invention. This application is hereby incorporated by reference into the present application.

Typically, the target element will be fashioned from metallic materials such as steel, aluminum, copper, nickel or amalgams thereof which have proven utility and are readily available; although, some semi-metallic materials such as carbon and silicon are also known to be suitable for the absorption of electromagnetic waves.

The target element can assume any form or shape consistent with the overall configuration of the adhesive device. Frequently, the target element will be presented as a metallic foil or strip, and, in some instances, it will be more effective to present the target element in the form of a fiber of an electromagnetic absorbable material. The point to be made is that the target element need only be fashioned from a material reasonably impervious to, and absorptive of, electromagnetic waves.

In use, the adhesive device needs to be situated adjacent to the glass product and the work surface. As a practical matter, of course, the glass product needs to be mostly transparent to electromagnetic waves. Some glass materials will be more transparent than others, and empirical adjustments can and will be made to modulate the quantity and intensity of electromagnetic wave energy needed to optimally activate the adhesive material.

In many instances, it will be sufficient for the adhesive device simply to be placed adjacent to the glass product and the work surface. In other construction or assembly situations, it will be necessary to make some arrangements or take additional steps to make sure the adhesive device remains in place prior to activation. Such an additional step need be little more than introducing an additional attachment element such as a small pressure sensitive adhesive area on the surface of the device. But such a measure, of course, would be optional procedure and in no way essential to the performance of the device in its broadest typical and routine applications.

When desirably situated adjacent to the glass product and the work surface, the adhesive device is ready to be exposed to electromagnetic waves, produced by and emanating from a generator powered by a source of alternating electric current. The generator can be held in a fixed position for assembly-line production or designed to be manipulated so as to quickly and easily pass over, around or near the strategically "hidden" device while emitting electromagnetic waves which will penetrate the "transparent" glass products, be absorbed by the target element, be converted to heat energy, activate the adhesive material resulting in a bonded relationship between the glass products and the work surface. To elaborate, somewhat, heat is produced in the conductive target element by two mechanisms: eddy current resistive heating and magnetic hysteresis. Eddy current resistive heating applies to all conductive materials and is produced in the target element by the electromagnetic waves emanating from the generator. The heat resulting from magnetic hysteresis is observed only in magnetic materials. As the electromagnetic field produced by the generator reverses polarity, the magnetized atoms or molecules in the target element also reverse. There is an energy loss in this reversal which is analogous to friction: this energy loss is magnetic hysteresis. The "lost" energy is quickly converted to heat and conducted by the target material to the contiguous, and frequently enveloping, heat-activatable adhesive material to initiate adhesion.

While the aforementioned heating mechanisms apply to most forms of absorbent target materials, there are factors which favor the use of a continuous, non-perforated metallic foil. These factors make foil targets having no apertures heat faster, more efficiently, and safer than other forms. In the eddy current resistive heating mechanism, the foil presents a larger target area; thus, more of the EM field is absorbed when compared to either particles or mesh. Thus, for a given EM field strength, the foil target heats more rapidly. Also, the foil allows the eddy currents to have an unobstructed current loop path. Meanwhile, particles are effectively unheatable by eddy currents since the gaps between particles do not allow a current loop path. In meshes, the current loop path is disrupted by the mesh which has the effect of regional uneven heating and localized hot spots.

In the magnetic hysteresis heating mechanism, the target must be formed of magnetically susceptible materials such as iron, nickel, cobalt, and compounds containing these elements. Magnetic hysteresis takes place each time the EM field reverses, thus higher heating rates are observed at higher frequency. Adhesives which are loaded with magnetically susceptible powders are generally heated at or above 10 megahertz.

The use of a foil target material allows a weaker EM field at a lower frequency than either meshes or particles. This yields several benefits. The EM field generator is smaller, lighter, and requires lower input energy. The lower frequency is also safer and allows operation without special guarding or other safety provisions. The preferred range for this invention is 50 kilohertz to 900 kilohertz; ideally, the frequency range is between 150 kilohertz and 300 kilohertz. The IEEE (Institute of Electrical and Electronic Engineers) standard C95.1-1991 refers to human safety for electromagnetic field exposure. This standard has also been adopted by the ACGIH (American Conference of Governmental and Industrial Hygenists) for "Biological Exposure Indices" 1996.

When heated to the necessary temperature, the adhesive material will liquefy or become heat-activated, attach itself to the work surface and, on cooling, create an adhesive relationship between the glass products and the work surface.

Two adhesion mechanisms, hot-melt and heat-activated cure, are proposed for use with the disclosed device. Both mechanisms are initiated by heat emanating from the target element. Hot-melt adhesives are solid at ambient temperatures, but melt or liquefy when the temperature is elevated by, for instance, heat accumulating in the target element. The melted adhesive "wets" the adherends and, in the case of porous, foraminous, or fibrous adherends, penetrates the surface of the pieces to be bonded. As the adhesive cools, the adherends and adhesive are bonded by the electrostatic attraction of polar molecular groups. Note that for the hot-melt mechanism, the bonding is reversible. Thus by repeating the induction heating procedure, the bond can be undone and the adherends separated. The ability to reverse the adhesion and separate fixed millwork is not a trivial attribute. In addition to the obvious advantage of being able to reassemble or repair misaligned glass products, it may also desirable to be able to disassemble affixed glass products to facilitate serviceability and repair.

Heat-activated curing adhesives are also solid and easy to manipulate at ambient temperatures, but when the adhesive temperature is elevated by, for example, the heat emanating from the target element, a chemical reaction is initiated. This reaction involves a cure or crosslinked bonding either within the adhesive or between the adherends. Such bonds are typically irreversible. Frequently, a heat-activated curing adhesive bond will demonstrate an electrostatic attraction between the adhesive and the adherends and a crosslinked bond within itself.

While the foregoing is a complete description of the disclosed method, numerous variations and modifications may also be employed to implement the purpose of the invention. And, therefore, the elaboration provided should not be assumed to limit the scope of the invention which is intended to be defined by the appended claims.

What is claimed is:

1. A method of assembling glass products to a work surface, which comprises: placing adjacent to the surfaces of the glass products and the work surface pieces to be joined a device comprising a target element composed of a continuous, non-perforated metallic foil strip contiguous with a heat activatable adhesive material, said target element being absorbent of electromagnetic waves which are convertible to heat energy to activate said adhesive material, holding said glass products and said work surface together, and exposing said device to electromagnetic waves to produce heat sufficient to activate the adhesive material to effect a bonded relationship between the glass products and the work surface.

2. The method of claim 1, wherein the frequency of the electromagnetic waves is between 50 kilohertz and 900 kilohertz.

3. The method of claim 1, wherein said foil strip is non-magnetic.

4. The method of claim 1, wherein said foil strip is manufactured from a metallic material taken from a group consisting of aluminum, copper, and steel.

5. The method of claim 1, wherein said heat activatable adhesive material is a hot-melt adhesive.

6. The method of claim 1, wherein said heat activatable adhesive material is a heat-activated curing adhesive.

7. The method of claim 1, wherein said heat energy is generated by eddy currents.

8. The method of claim 1, wherein said heat energy is generated by hysteresis.

9. The method of claim 1, wherein the frequency of the electromagnetic waves is between 150 kilohertz and 350 kilohertz.

10. A method of adhering glass products to a work surface, which comprises: placing adjacent to the glass products and the work surface to be joined a device comprising a target element composed of a metallic foil strip contiguous with a heat activatable adhesive material, said target element being absorbent of electromagnetic waves which are convertible to heat energy to activate said adhesive material, holding said glass products and said work surface, and exposing said device to electromagnetic waves having frequency between 150 kilohertz and 300 kilohertz to produce heat sufficient to activate the adhesive material to effect a bonded relationship between said glass products and said work surface.

* * * * *